UNITED STATES PATENT OFFICE.

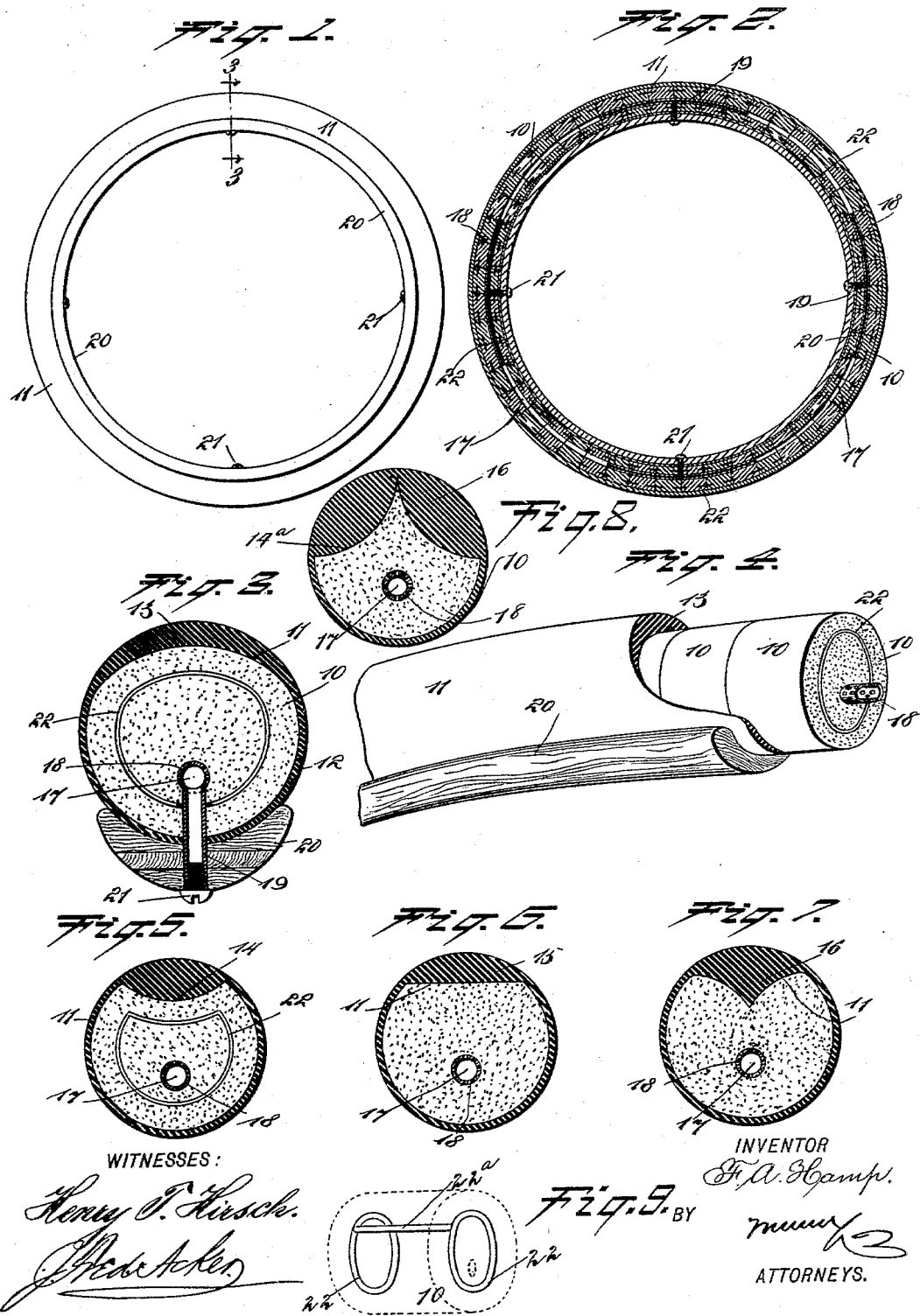

FRANZ ANTON HAMP, OF TERRE HAUTE, INDIANA.

VEHICLE-TIRE.

SPECIFICATION forming part of Letters Patent No. 596,811, dated January 4, 1898.

Application filed March 20, 1897. Serial No. 628,467. (No model.)

*To all whom it may concern:*

Be it known that I, FRANZ ANTON HAMP, of Terre Haute, in the county of Vigo and State of Indiana, have invented a new and useful Improvement in Bicycle and other Vehicle Wheel-Tires, of which the following is a full, clear, and exact description.

The object of my invention is to provide a wheel-tire which will be absolutely puncture-proof and which will possess all of the resiliency, elasticity, and desirable qualities of a pneumatic tire without any of its disadvantages.

Another object of the invention is to construct a non-puncturable tire which will be simple, durable, and economic, and, furthermore, to construct the tire in such manner that no matter to what degree the outer covering of the tire may become lacerated the tire in its entirety may still be advantageously used.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the improved tire applied to the rim of a wheel. Fig. 2 is a vertical section through the improved tire and through the rim of a wheel. Fig. 3 is a transverse section taken substantially on the line 3 3 of Fig. 1. Fig. 4 is a perspective view of a portion of a rim and a portion of the improved tire, the outer covering of the latter being partly broken away. Figs. 5, 6, 7, and 8 are transverse sections through the improved tire, illustrating slight modifications in its construction; and Fig. 9 is a view illustrating how the strengthening devices of the cork sections may be connected.

The body of the tire consists of a suitable number of substantially cylindrically-shaped cork sections 10, which are glued or cemented together or otherwise closely united. The said cork sections are not strictly cylindrical, since the tread portion 11 of each section is more or less depressed, as shown in Fig. 3, for example, in which the outer covering 12, which is of rubber tubing such as is used in other bicycle-tires, is at its tread portion provided with an interior enlargement 13, whereby said tread portion of the rubber covering 12 of the tire is much thicker than at other points, providing for increased elasticity and likewise providing a means for holding the cork sections in position.

The enlargement at the tread-section of the rubber covering or tubing 12 may be given different shapes—as, for example, the inner surface of the tread may be decidedly convexed, as shown at 14 in Fig. 5, or concaved, as shown at 14ᵃ in Fig. 8, or it may be made straight, as illustrated at 15 in Fig. 6, or angular, as shown at 16 in Fig. 7; but in every event the tread-surfaces of the cork sections are made to correspond to the shape of the enlargement of the tread portion of the rubber covering 12.

Each cork section of the tire is provided with a diametrical opening 17, preferably round in cross-section, the opening being located between the center of the section and what may be termed its "inner" peripheral surface. When the cork sections are brought together and secured, the openings 17 being brought end to end constitute an endless canal. In sundry portions of the canal—for example, at opposite faces of the tire—perforated tubes 18, usually made from aluminium, are introduced into the canal, and each perforated tube is connected with a branch tube 19, interiorly threaded and of such length as to extend through the rim 20 of the wheel, to which rim the tire is to be cemented, glued, or attached by other well-known means. The outer ends of the branch tubes 19 are closed by screws 21, which serve also to hold the tire to an engagement with the rim, as shown in Figs. 1, 2, and 3.

The canal is adapted to receive and contain a fluid, which fluid will keep the cork elastic and moist for a long time and will preserve the rubber, preventing it from cracking or becoming hard. The fluid which it is proposed to use for this purpose consists of amyl-alcohol, margaric acid, and glycerin. The ingredients are used in about the following proportions: amyl alcohol, one ounce; margaric acid, one dram, and glycerin four drams.

A ring or a spring or springs 22, preferably made of metal—as, for example, aluminium— is pressed into each end of each cork section, the rings or springs being adapted to protect the tire against extraordinary pressure and from being damaged from coming in contact with any object when riding.

The tire is exceedingly simple. It is durable. It is economic, as stated. It is always ready for use, and may be said to be absolutely puncture-proof.

The strengthening devices 22, whether made in ring or spring form, may be connected in each cork section 10 by a rod, link, or bar 22$^a$ or its equivalent, as shown in Fig. 9.

Having thus described my invention, I claim as new and desire to secure by Letters Patent—

1. A tire comprising a series of cork sections and a covering for the sections, the tire being provided with a canal extending through the cork sections and having its walls formed by the cork surface, said canal being adapted to receive and contain a preservative liquid, as and for the purpose specified.

2. A tire consisting of a series of cork sections and a covering therefor, the said tire being provided with an interior canal extending through the cork sections and tubes leading from the exterior of the tire to the said canal, whereby a preservative liquid may be applied directly to the cork sections, as and for the purpose set forth.

3. A wheel-tire consisting of a series of connected cork sections, said connected sections being provided with a canal, perforated tubes located in the canal, and supply-tubes leading from the exterior of the tire to the perforated tubes, as and for the purpose specified.

4. A tire for a wheel, the body portion whereof consists of connected solid sections, of an elastic material, and a rubber covering for the body having its tread-surface enlarged upon its inner side, the sections of the body being shaped to correspond at their tread-surfaces to the interior shape of the tread portion of the rubber covering, and strengthening devices pressed into each end of the several sections, as and for the purpose specified.

5. In a wheel-tire, a body portion consisting of a series of connected sections, of a solid elastic material each section being provided with a strengthening device at each end, the strengthening devices in each section being connected together and serving to protect the tire against extraordinary pressure, and a rubber covering for the body, as and for the purpose specified.

6. In a wheel-tire, a body portion consisting of a series of cylindrical sections of cork, a rubber covering for the body, the cork sections being provided with a continuous canal, tubes communicating with the said canal and extending out beyond the exterior of the tire, whereby a preservative liquid may be applied to the interior surface of the cork sections, and screw-plugs for closing said tubes, the said screw-plugs also serving to hold the tire to an engagement with the rim, as and for the purpose set forth.

7. A preservative compound for bicycle-tires constructed of cork and rubber, said compound consisting of amyl alcohol, margaric acid and glycerin, as specified.

FRANZ ANTON HAMP.

Witnesses:
GUSTAV A. CENZMAN,
CHAS. THEODORE LAUB.